Nov. 17, 1925.

B. P. HANSON 1,561,644

KNOCKDOWN FEEDER

Filed Aug. 1, 1923

Inventor:
B. P. HANSON.
By W. T. FitzGerald
Attorney.

Nov. 17, 1925.
B. P. HANSON
1,561,644
KNOCKDOWN FEEDER
Filed Aug. 1, 1923  2 Sheets-Sheet 2
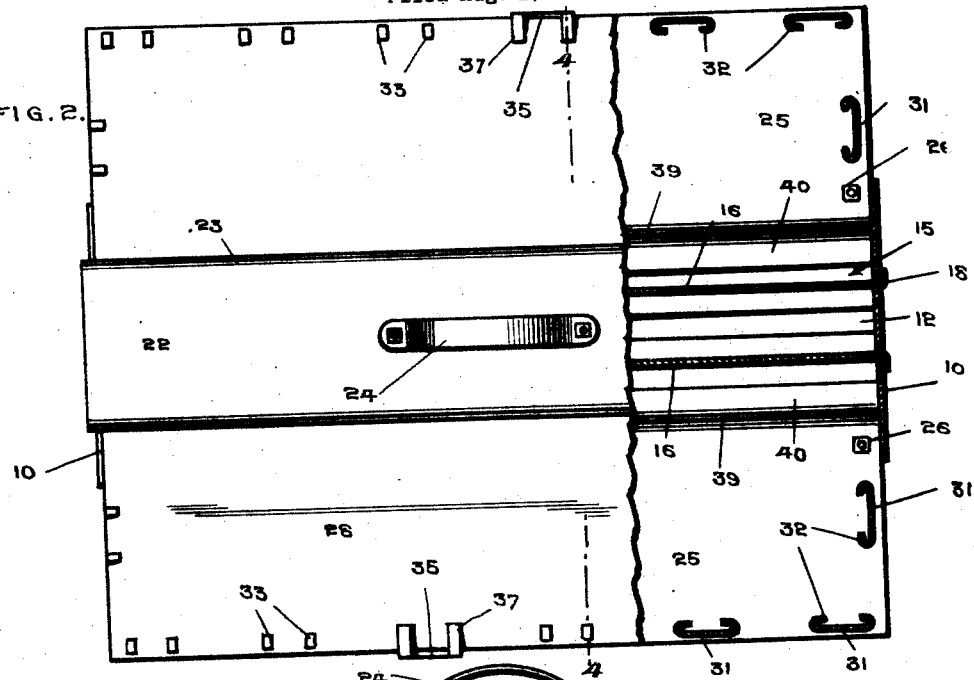
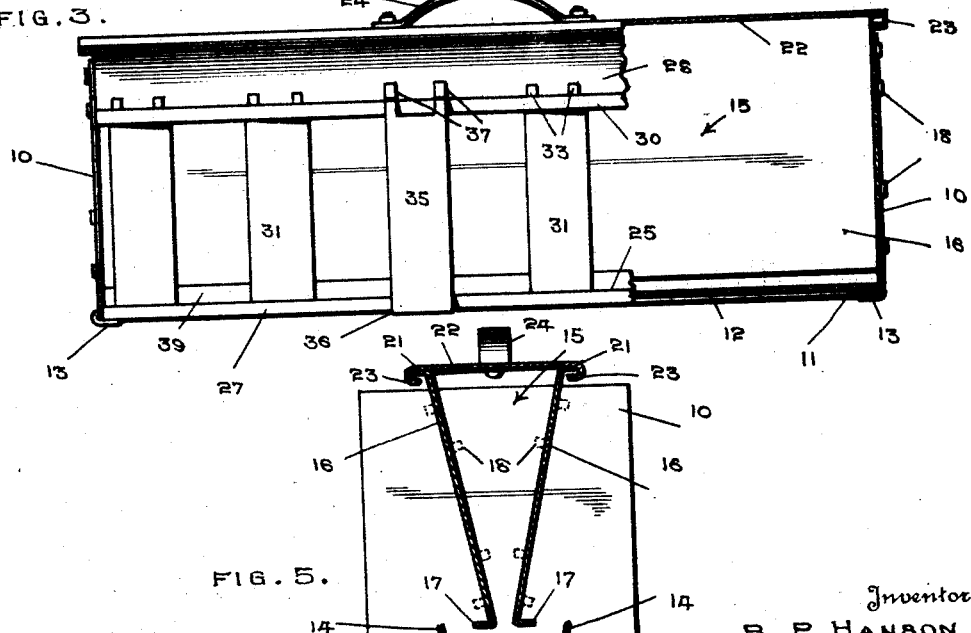
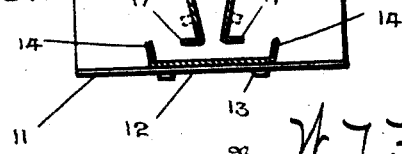
Inventor:
B. P. HANSON,
By W. J. FitzGerald & Co.
Attorney.

Patented Nov. 17, 1925.

1,561,644

UNITED STATES PATENT OFFICE.

BENNIE P. HANSON, OF CEDAR FALLS, IOWA.

KNOCKDOWN FEEDER.

Application filed August 1, 1923. Serial No. 655,050.

*To all whom it may concern:*

Be it known that I, BENNIE P. HANSON, a citizen of the United States, residing at Cedar Falls, in the county of Black Hawk and State of Iowa, have invented certain new and useful Improvements in Knockdown Feeders; and I do hereby declare the following to be a full, clear, and exact description of the invention, such as will enable others skilled in the art to which it appertains to make and use the same.

The present invention relates to automatic feeders, and aims to provide a novel and improved feeder intended for poultry, especially chicks.

It is the object of the invention to provide such a feeder constructed cheaply from sheet metal, and having a novel construction and assemblage of the component elements, whereby the device can be shipped and stored in collapsed or knock-down condition within small space, the parts being readily assembled and the device being practical and efficient in use, as well as sanitary inasmuch as the device can be readily taken apart for cleaning.

Another object is the provision of novel means, in combination with the feeder proper, for preventing the chicks from being annoyed or interfered with, while feeding, by the hen or other chickens.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings, wherein—

Fig. 2 is a plan view of the device, with portions broken away and shown in section.

Fig. 3 is a side elevation of the feeder, portions being broken away and shown in section.

Fig. 5 is a cross section showing the feeder proper as used without the protectors.

Figure 1:
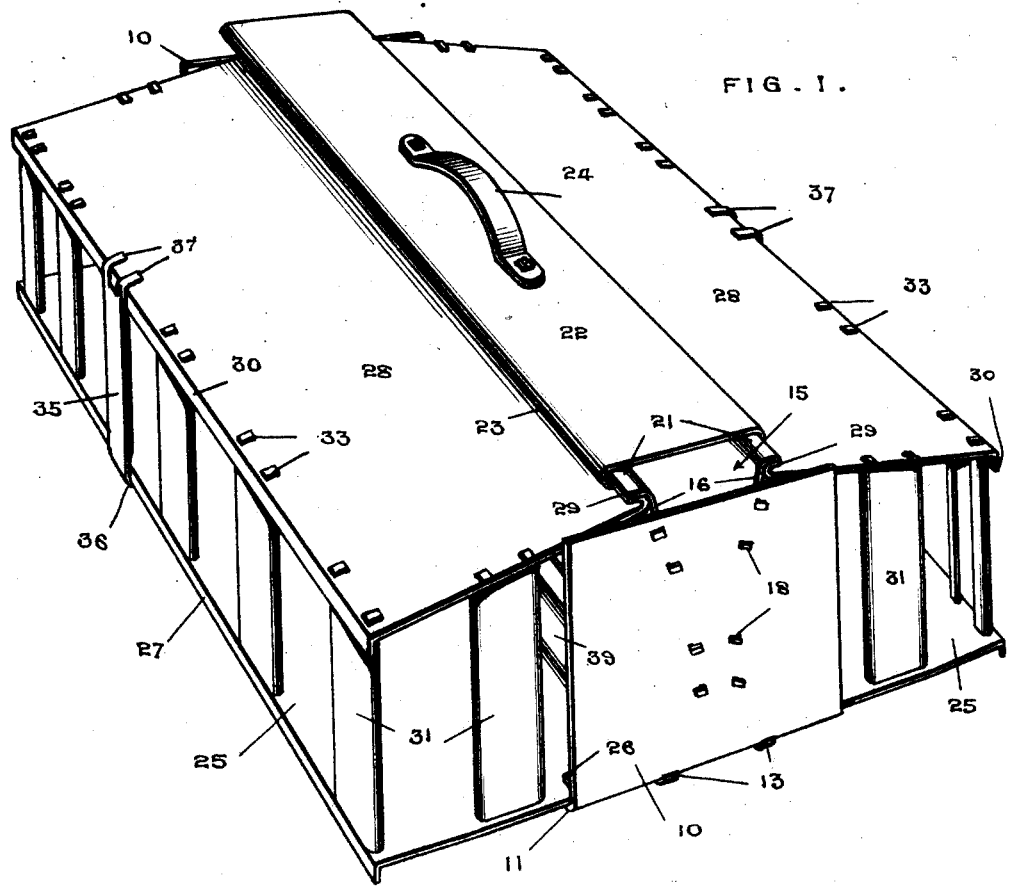
Figure 1 is a perspective view of the improved feeder with the slide cover partly opened.
Figure 4:
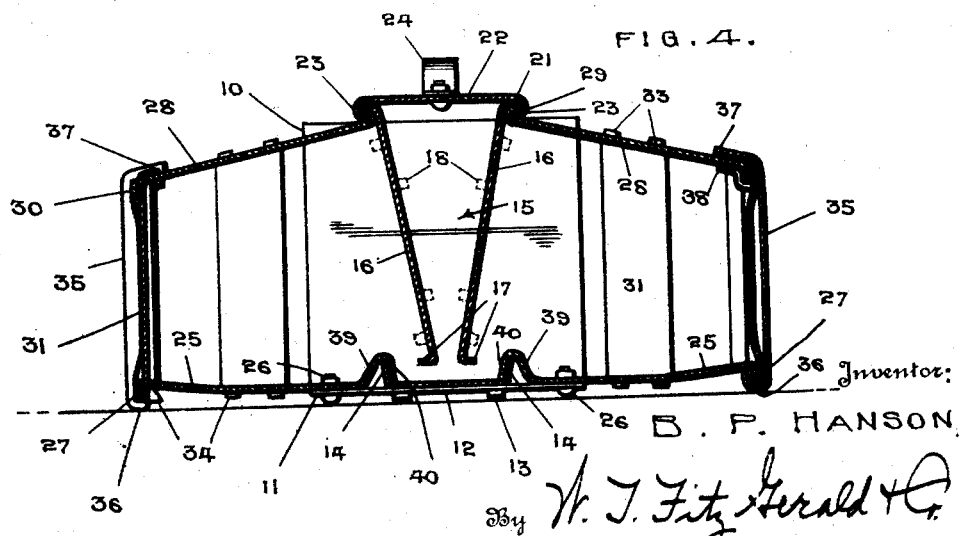
Fig. 4 is a cross section on the line 4—4 of Fig. 2.

The feeder is of elongated form, being of any suitable length, and the device can be made in different sizes according to the poultry or animals to be fed. End members 10 are provided, which are composed of rectangular plates of sheet metal disposed in vertical transverse planes, and having the flanges or feet 11 at their lower edges bent inwardly to set upon the ground or floor. A sheet metal strip 12 is disposed longitudinally with its ends overlapping the flanges or feet 11 and secured thereto by means of ears 13 extending from the ends of the strip 12 through slots in the end members 10 and bent back under the flanges 11. The edge portions of said strip are bent upwardly at an angle, as at 14, whereby said strip forms a feed trough into which the feed flows from the hopper 15 above the trough, in order that the feed can be eaten from the trough at the opposite sides thereof.

The hopper 15 for holding the feed comprises the opposite side plates 16 which are inclined to diverge upwardly laterally, with their lower edges spaced apart to provide a slot down through which the feed can flow to the longitudinal central portion of the trough, the lower edges of the plates 16 being bent away from one another, as at 17, to let the feed flow out from under said edges into the trough toward the flanges or side walls 14 of the trough. The lower edge portions 17 of the plates 16 are spaced above the trough. The plates 16 are provided at their ends with ears 18 extending through slots in and bent against the end members 10, to attach the plates 16 to said end members, and thereby provide a substantial construction.

The upper edges of the plates 16 are bent away from one another at an angle to provide lips 21 projecting above the plane of the upper edges of the end members 10 for the engagement of an elongated slide cover 22 also made from sheet metal. The edge portions of the cover 22 are bent downwardly, as at 23, to engage slidably under the lips 21 when the cover is slid lengthwise, and the lips 21 projecting above the end members 10 enable the cover to be slid to closed and open positions over either end member 10, as suggested in Fig. 1. The cover has a handle 24 thereon to be readily slid open for pouring feed into the hopper, and when the cover is slid closed this will prevent the feed from being eaten out of the hopper, as well as protecting the feed from the elements. The handle 24 can also be used in lifting or carrying the device.

The structure as thus far described constitutes the feeder proper, and same can be used by itself, as shown in Fig. 5, whereby the feed can be partaken of by chickens as well as the chicks.

In order that the chicks can obtain the feed without being annoyed or interfered with by the hen or the other chickens, protectors or guards are attached to the opposite sides of the feeder proper, to provide a housing for the chicks which will exclude the hen and other chickens from the feed trough. The protectors are of similar construction, and each of them includes a sheet metal floor or bottom 35 having its inner corner portions overlapping and seated on the flanges 11 and secured to said flanges by the bolts 26 or other securing elements. The bottom or floor 25 has a downturned flange 27 at its outer edge to stiffen said edge of the floor and to support the floor above the ground or surface on which the device is seated. Each protector also includes an inclined sheet metal roof or top 28, the inner upper edge of which is bent back upwardly, as at 29, to fit under the corresponding lip 21, so that the bent under edges 23 of the cover 22 can engage under the edges 29 of the roofs 28, and this will secure the inner edges of the roofs to the side plates 16 of the hopper without other securing means or elements being used. The outer edges of the roofs 28 have downturned flanges 30 for stiffening said edges of the roofs, and said roofs slope downwardly toward the opposite sides from the cover 22, for shedding rain.

Each protector also includes vertical slats or posts 31 of sheet metal, having their vertical edges bent back inwardly, to stiffen said slats, and said slats are disposed between the roofs 28 and floors 25 of the protectors at the ends and outer edges thereof in spaced relation. The slats 31 have ears 33 at their upper ends extending up through the roofs 28 and bent down against said roofs, for securing the upper ends of the slats to the roofs, and the lower ends of the slats have ears 34 extending through the floors or bottoms 25 and bent to secure the lower ends of the slats on said floors, thereby providing a substantial construction.

One slat 35 of each protector is slidably mounted along the outer edges of the floor 25 and roof 28 in order that access can be had into the protector for cleaning same out, or for reaching into the protector for removing chicks therefrom. The slat 35 bears slidably at its upper and lower ends against the flanges 27 and 30, and the lower end of the slat is bent back inwardy into a hook 36 engaging slidably under the flange 27. The upper end of the slat 35 has fingers 37 bent over the roof 28 and a finger 38 bent behind the flange 30 and under the roof 28, whereby the lower and upper ends of said slat are slidably connected with the outer edge portions of the floor 25 and roof 28, permitting said slat to be slid adjacent to one of the slats 31 to provide a larger opening than the openings provided between the slats when the slat 35 is in normal position intermediate the corresponding slats 31.

The floors or bottoms 25 of the protectors have the upturned portions 39 adjacent to their inner edges, and the inner edge portions of said floors are downturned, as at 40, to overlap the flanges or side walls 14 of the trough.

By sliding the cover 22 off of the roofs 28, and removing the bolts 26, the protectors are readily removed as units from the feeder proper, whereby the feeder unit can be used itself, as shown in Fig. 5.

The entire device, with the exception of a few bolts or other securing elements used, is composed of sheet metal, and the several parts can be compactly nested for shipment or storage. The device can also be conveniently set up or assembled for use.

Having thus described the invention, what is claimed as new is:—

1. A feeder comprising end members, a feed trough between and secured to said end members, a hopper above said trough between and secured to said end members, a slide cover on the hopper, and a housing including a bottom, top and portions between and connecting said top and bottom, the housing bottom being detachably connected with said end members and trough and the top having a portion to be engaged by said slide cover for holding the top assembled with the hopper.

2. A feeder comprising sheet metal end members having inwardly bent flanges at their lower edges, a feed trough having its ends seated on and secured to said flanges and having side walls along its edges, a hopper above said trough, and a housing including a top, a bottom and slats between and secured to the top and bottom, said bottom being detachably secured on said flanges and having at its inner edge a portion to engage over the corresponding side wall of the trough.

3. A feeder comprising end members, a feed trough between and secured to said end members, a hopper above the trough including side plates secured to the end members, a slide cover engaging the upper edges of said side plates, and a housing including a bottom detachably secured to said end members, a top and slats between and secured to said top and bottom, the top having its inner edge portion arranged to be engaged by said slide cover for holding the top in place.

4. A feeder comprising end members having lower inturned flanges, a feed trough having its ends seated on and secured to said flanges, a hopper above the trough comprising side plates secured to said end members and having outturned lips at their upper edges, a slide cover having downwardly bent edges to engage under said lips, and a housing including a bottom overlapping and secured to said flanges, a top and slats secured to said top and bottom, the inner edge of the top being bent back to fit under the corresponding lip for the engagement of the corresponding edge of the cover for holding said top in place.

In testimony whereof I have signed my name to this specification.

BENNIE P. HANSON.